United States Patent [19]
Armstrong et al.

[11] Patent Number: 5,883,040
[45] Date of Patent: Mar. 16, 1999

[54] ACTIVATED CARBON PRODUCED FROM AGRICULTURAL RESIDUES

[75] Inventors: Daniel W. Armstrong; Virgil J. Flanigan; William J. James; Jui-Lung Li; Kimber L. Rundlett, all of Rolla, Mo.

[73] Assignee: The Curators of the University of Missouri, Columbia, Mo.

[21] Appl. No.: 455,841

[22] Filed: May 31, 1995

[51] Int. Cl.$^6$ ................................................. B01J 20/02
[52] U.S. Cl. ............................................................ 502/437
[58] Field of Search .................................. 502/437, 432; 423/445 R

[56] References Cited

U.S. PATENT DOCUMENTS

| | | | |
|---|---|---|---|
| 1,543,763 | 6/1925 | Gambel . | |
| 3,125,043 | 3/1964 | Gravel | 110/28 |
| 3,451,944 | 6/1969 | Finch | 252/421 |
| 3,511,601 | 5/1970 | Bieler et al. | 23/110 |
| 3,592,779 | 7/1971 | Kiikka | 502/437 |
| 3,668,145 | 6/1972 | Belter et al. | 252/421 |
| 3,680,699 | 8/1972 | MacPherson | 210/75 |
| 3,787,328 | 1/1974 | Deline | 252/427 |
| 3,902,998 | 9/1975 | Bertram | 210/40 |
| 3,926,814 | 12/1975 | Hogarth | 210/323 |
| 4,105,459 | 8/1978 | Mehta | 106/98 |
| 4,230,602 | 10/1980 | Bowen et al. | 502/484 |
| 4,552,863 | 11/1985 | Fujimori | 502/418 |
| 4,616,001 | 10/1986 | Sato | 502/437 |
| 4,645,605 | 2/1987 | Durham | 210/679 |
| 4,676,907 | 6/1987 | Harrison | 210/617 |
| 4,760,046 | 7/1988 | Bürger et al. | 502/437 |
| 4,872,993 | 10/1989 | Harrison | 210/666 |
| 5,008,021 | 4/1991 | Conner et al. | 210/751 |
| 5,064,805 | 11/1991 | Otowa | 502/427 |
| 5,078,795 | 1/1992 | Conner et al. | 106/624 |
| 5,102,855 | 4/1992 | Greinke et al. | 502/437 |
| 5,106,510 | 4/1992 | Rieber | 210/717 |
| 5,158,593 | 10/1992 | Delima | 71/9 |
| 5,164,355 | 11/1992 | Farris et al. | 502/420 |

*Primary Examiner*—Michael Lewis
*Assistant Examiner*—Stuart L. Hendrickson
*Attorney, Agent, or Firm*—Senniger, Powers, Leavitt & Roedel

[57] ABSTRACT

A process for producing activated carbon from agricultural residues by heating the residues to a temperature in the range of about 250° C. to about 550° C. to volatilize organic compounds in the residues and to carbonize the residues and further heating to activate the carbonized residues. Activated carbon produced from agricultural residues.

3 Claims, No Drawings

ACTIVATED CARBON PRODUCED FROM AGRICULTURAL RESIDUES

BACKGROUND OF THE INVENTION

This invention relates to a process for making activated carbon from agricultural residues including seed hulls such as rice hulls, fescue hulls, wheat hulls, oat hulls and the like.

Disposal of agricultural residues has become costly as available landfill space is exhausted. In certain areas, such as California, for example, environmental laws may prohibit such disposal. It has therefore become increasingly important to develop alternatives to disposal in landfills, such as transformation into useful industrial products.

Certain agricultural residues have been processed into activated carbon. Activated carbon is widely used in both gas phase and liquid phase applications such as purification and separation of gases, recovery of solvents, purification of water, removal of color from water, industrial and municipal waste water treatment, and the like. Activated carbon is also used as a catalyst or a carrier for catalysts in chemical synthesis processes. Among the various materials which have been used for the manufacture of activated carbon are lignite, coal, bones, wood, peat, lignin, coconut shells, and petroleum residues.

Otowa, U.S. Pat. No. 5,064,805, disclosed a method of producing activated carbon by mixing coconut shell char with melted potassium hydroxide hydrate. The mixture was heated to a temperature of 500° C. in the presence of nitrogen gas until the evolution of water vapor subsided, then to 800° C. where activation was carried out for 100 minutes.

Sato, U.S. Pat. No. 4,616,001, disclosed a method of making activated carbon by first coking shells of macadamia nuts at 400°–900° C. and subsequently activating the resulting carbonized materials with steam at a temperature of 900° C.

Gambel, U.S. Pat. No. 1,543,763, disclosed a method of producing decolorizing carbon by charring rice hulls without sufficient air contact to prevent burning up a material proportion of the carbon present, boiling in a caustic soda solution to remove silica, and then washing with carbonic acid.

Fujimori, U.S. Pat. No. 4,552,863, disclosed a process for producing granular activated carbon using wood as a carbon source. The wood is first pulverized and then pelletized. The resulting pellets are carbonized by heating to a temperature of 500° to 600° C. in an oxygen-free furnace. The carbonized pellets are then activated at a temperature in the range of 850° to 900° C. with steam.

Farris et al., U.S. Pat. No. 5,164,355, disclosed a method of making an oxygen-selective carbon molecular sieve from granular coconut shell char for air separation. The shells were crushed and sized to provide shell granules, which were then heated in a flowing stream of inert gas at an average temperature rate increase of about 2° to 12° C. per minute to reach a peak temperature of 775° to 900° C. The granules were held at the peak temperature for a period of time so that the heating and holding steps totaled up to about 8 hours to produce the granular char, which is then cooled in an inert gas atmosphere.

SUMMARY OF THE INVENTION

It is an object of this invention to provide an environmentally compatible method for disposing of agricultural residues, including rice hulls, fescue hulls, wheat hulls, oat hulls and the like. Among further objects are to provide a process for producing high quality activated carbon from such residues, to provide a process for recovering useful oils from such residues, to provide such a process which uses less energy, less hazardous chemicals, and fewer processing steps, and to provide activated carbon having improved adsorptive capacity.

Briefly, therefore, the invention is directed to a process for producing activated carbon from agricultural residues. Agricultural residues having less than about 10% by weight lignin are heated to a temperature of at least about 250° C. to volatilize organic compounds in the residues and to begin to carbonize the residues. The carbonized residues are activated by heating to produce activated carbon.

The invention is also directed to a process for producing activated carbon from agricultural residues. Substantially lignin-free agricultural residues are heated to a temperature of at least about 250° C. to volatilize organic compounds in the residues and to begin to carbonize the residues and the carbonized residues are activated by heating to produce activated carbon.

The invention is further directed to a process for producing activated carbon from rice hulls. Rice hulls are heated to a temperature of at least about 250° C. to volatilize organic compounds associated with the hulls and to carbonize the hulls to yield carbonized residues. The carbonized residues are activated by heating to produce activated carbon.

Still further, the invention is directed to a process for producing activated carbon from rice hulls. Rice hulls are heated to a temperature in the range of about 300° C. to about 400° C. for between about two and about four hours to carbonize the hulls while flowing an inert gas over the hulls to carry away organic compounds volatilized during the heating in an exhaust stream and to prevent said organic compounds from condensing on the hulls, thereby producing carbonized residues. Maltol and aliphatic acids are recovered from the exhaust stream. The carbonized residues are activated by heating to a temperature in the range of about 650° C. to about 750° C. for between about two and about 3.5 hours in the presence of carbon dioxide to produce activated carbon. The activated carbon is washed with an acid solution selected from the group consisting of hydrochloric acid solution and carbonic acid solution to remove metal impurities and thereby produce standardized, washed activated carbon. Finally, the standardized, washed activated carbon is washed with water.

The invention is further directed to activated carbon consisting of residues produced by heating rice hulls to a temperature in the range of about 250° C. to about 550° C. to volatilize organic compounds in the hulls and to carbonize the hulls, the hulls further being activated by heating.

Other objects and features of the invention will be in part apparent and in part pointed out hereinafter.

DETAILED DESCRIPTION OF THE INVENTION

In accordance with this invention, various types of agricultural residues which are normally considered waste materials are transformed into activated carbon suitable for use in any of a number of applications. Useful oil is obtained as a by-product. Among seed hulls which are suitable starting materials are cereal hulls, such as rice hulls, fescue hulls, wheat hulls and oat hulls, and certain other hulls, such as barley hulls.

The agricultural residues used in accordance with the present invention have a relatively low lignin content, i.e., no more than about 10% by weight lignin. Preferably, the agricultural residues contain less than about 5% by weight lignin, more preferably the agricultural residues are substantially lignin-free (2% by weight lignin or less), and ideally, the agricultural residues contain less than about 1% by weight lignin. Lignin is a polyphenolic substance which creates a tarry residue when heated. It is present in wood, nut shells, coconut shells, and many other plant parts. The residues used in this invention are low lignin or substantially lignin-free because the conditions, particularly times and temperatures, used in this process are sufficient to transform lignin in residues to a tarry substance but are not sufficient to adequately volatilize or carbonize significant quantities of the tarry substance such that it is transformed or carried away from the residues during processing. If the residues used were not substantially lignin-free or at least relatively low lignin, therefore, this tarry substance would remain on the residues after processing and would detract from their efficacy as activated carbon. Furthermore, because the preferred residues are low-lignin or substantially lignin-free, pretreatment with hazardous or costly chemicals for lignin degradation or removal is not required, nor is thermal treatment at high temperatures for prolonged reaction times.

It is also preferred that the residues used herein are of a size and nature that they do not require substantial mechanical pretreatment. Starting materials including wood and certain nuts and shells used in prior processes must be pulverized, ground and sized, or dehusked prior to processing into activated carbon. The residues of the present process therefore preferably have a size, without grinding, of less than about 1 cm×0.4 cm×0.02 mm and a weight of less than about 4 mgs. More preferably, they have a size of less than about 0.6 cm×0.3 cm×0.002 mm and a weight of less than about 3 mgs. Advantageously, the preferred residues of the invention are amenable to carbonization and activation without pretreatment size reduction, dehusking, chemical pretreatment or the like. Although this process does comprise an optional grinding operation after activation, as described below, such grinding requires significantly less energy, capital costs, and equipment maintenance than pretreatment grinding, since the residues of the invention become more fragile and smaller during processing and their size is more easily reduced than that of starting materials in certain prior processes.

In accordance with the invention, agricultural residues are introduced into a heating device in which they are heated to an elevated temperature. In one preferred embodiment, they are introduced into a horizontal rotary kiln having a gas inlet port, an exhaust port and a thermocouple insert. The gas inlet port is connected to a gas source and the exhaust port has an associated condenser to collect liquid by-products. The kiln is purged with an inert gas such as nitrogen or argon to drive off air and moisture present. The temperature of the kiln is then raised to a temperature in the range of about 250° C. to about 550° C., preferably about 300° C. to about 400° C., more preferably about 350° C. In the preferred temperature range, the residues are maintained at this temperature for between about 1 and about 4 hours, preferably for between about 2 and about 3 hours, in order to volatilize organic compounds in and on the residues and to carbonize the remaining solid residue. While maintained at this temperature, an inert gas such as nitrogen or argon, preferably nitrogen, is flowed through the kiln and over the residues at a flowrate sufficient to carry away organic compounds volatilized during heating and to prevent such compounds from condensing on the residues. The inert gas flow also prevents the oil and residues from oxidation and other deleterious reactions. The required inert gas flowrate varies with the size and geometry of the kiln, but a flowrate is selected which is sufficient to carry the volatilized organics away from the residues.

During this volatilization and carbonization operation, volatilized organic compounds, especially oils, carried away from the residues and through the exhaust port are recovered. In order to facilitate recovery of these oils, the kiln temperature during this operation is maintained above the temperature at which they are volatilized but below the temperature at which they decompose. If the temperature is above this latter temperature, the value of the oils is reduced and their potential for decomposition and deposit on the residues before being carried from the kiln is increased. Recovery of the volatilized oils is accomplished by a condenser associated with the exhaust port through which volatilized oils are carried by the inert gas flowed through the kiln. The condenser comprises, for example, a liquid nitrogen bath, ice bath, or cold trap. Depending on the residues, the oils produced include, for example, fatty and other aliphatic acids and maltol. Fatty and other aliphatic acids are used, for example, in animal feed and soap manufacture. Maltol is used, for example, as a flavoring agent to impart a freshly baked odor and flavor to breads and cakes. Dimethylpyrozol is a useful carbon and nitrogen source and a useful precursor in industrial and synthetic processes. As a further option, low molecular weight hydrocarbon gases and liquids produced during the carbonization can be recovered and burned as a fuel source.

After carbonization the residues are activated by heating to a temperature of at least about 600° C., preferably to a temperature in the range of about 600° C. to about 800° C., more preferably about 600° C. to about 750° C., still more preferably about 650° C. to about 750° C., most preferably to about 700° C. The residues are maintained at this temperature for between about 1 and 5 hours, preferably for between about 2 and about 3½ hours, preferably for about 3 hours at 700° C. Lower temperatures such as about 550° C. can be used for activation, but the time required for activation at such temperatures is significantly increased and the degree of activation may suffer, that is, the resulting activated carbon is not as adsorbent as when activation occurs at higher temperatures. On the other hand, in the instance of certain residues such as rice hulls, the temperature is maintained below 800° C., preferably below about 775° C. so that amorphous silica in the residues is not transformed to crystalline silica, which has a tendency to seal the pores on the residues and therefore reduce the adsorptive capacity of the eventual activated carbon product. During this heating operation a gas, preferably carbon dioxide, is flowed through the kiln and over the residues for activation to produce activated carbon particles from the residues. Other gases such as nitrogen oxides are also suitable, but such gases present hazards and are therefore not preferred in most instances. Steam can also be used, but is not believed to be as effective as carbon dioxide.

The activated carbon particles are allowed to cool, preferably to ambient temperature, and then are optionally ground to a desired particle size to increase their surface area. For activated carbon which is produced from rice hulls and which passes 100 mesh, the surface area has been found to be about 1100–1300 $m^2$ per gram of material. For activated carbon produced from fescue and from wheat hulls and which passes 100 mesh, the surface area has been found to be about 1400–1600 $m^2$ per gram of material.

The particles are optionally washed with an acid solution, such as carbonic acid ($H_2CO_3$) or dilute HCl for purposes of trace metal impurity removal and standardization of the particles. This is the next process step immediately after cooling and the optional grinding step. It has been discovered that with the sequence of process steps of our invention, there is no need for an intermediate step of boiling or washing with caustic soda or other alkali solution and therefore such a step is advantageously dispensed with. The acid solution should be strong enough to wash away trace metals on the particles. This washing operation lowers the pH of aqueous solutions of the particles to between about 4 and about 5.5, preferably to between about 4.5 and about 5.0. A preferred acid wash solution is a dilute HCl solution having a strength of between about 0.001N and 2.0N, more preferably between about 0.01N and 0.5N, most preferably about 0.1N. The need for this acid wash step depends in part on the metal content of the original residues and on their history including, for example, the metal content of the soil in which the precursor grains were grown. If the activated carbon is to be used in the purification of water for drinking, or for the food and beverage industry, this acid wash is more likely to be necessary. For certain industrial applications such as waste water treatment and air treatment, a higher level of impurities is often tolerable and therefore acid washing may not be required. Also, where the activated carbon is to be used in gas purification applications, acid washing is often not required because trace metals are not released from the carbon in gaseous operations. A further purpose of this acid wash is to standardize activated carbon particles from residues from various sources so they produce a similar pH when used in water and behave similarly regardless of origin and handling. The grinding operation described above is optionally performed after the washing step. An optional final washing with tap water, distilled water, or deionized water is also practiced, although this is typically not required when carbonic acid is used in prior acid wash.

In an alternative embodiment of the invention, peanut shells are used as the initial agricultural residue. Peanut shells are distinct from the residues used in the previously described embodiments because peanut shells have a higher lignin content, believed to be up to about 20%. Peanut shells are also distinct from other nut shells, such as coconut shells and macadamia nut shells, in that peanuts grow underground, rather than on trees. The peanut shells are processed in the same manner as the residues described above, but are first preferably ground to a size of less than about 1 cm×0.4 cm×0.02 mm and weight less than about 4 mgs.

Further illustration of the invention is provided by the following examples:

EXAMPLE 1

Agricultural residues consisting of rice hulls (160 grams) were placed in a horizontal rotary kiln about 12 inches long and 6 inches in diameter. The kiln was equipped with a gas inlet port, an exhaust port, and a thermocouple insert. Nitrogen (0.9–1.5 L/min flowrate) was flowed through the kiln for about 30 min. to purge the kiln of air and moisture. The kiln was then heated by gas or electric burners until the residues reached a temperature of 300° C. The residues were maintained at a temperature in the range of 300°–400° C. for approximately 3 hours under a nitrogen flowrate which fluctuated between 0.9 and 1.5 L/min to volatilize organics in and on the residues and to carbonize them. During this operation, oil was collected by condensation in a cold trap located at the exhaust port. This oil was determined by mass spectral analysis to contain the following:

| Component | Approx. Wt. % |
|---|---|
| Acetic acid | 6 |
| Propanoic acid ($C_3$ acid) | 4 |
| Anoic acid ($C_4$ acid) | 4 |
| Dimethyl pyrazole | 15 |
| Hexanoic acid | 0.7 |
| Alkylatedfuranol | 2 |
| Maltol | 10 |
| Alkylated phenol | 2 |
| Alkylated cyclohexane | 5 |
| Alkylated cyclobutane | 8 |
| Aliphatic acids (fatty acids) | 33 |
| Others | balance |

After carbonization the residues were heated to a temperature of 700° and maintained at a temperature in the range of 700°–750° C. for approximately 3 hours under a carbon dioxide flowrate of about 0.4 L/min. The heat was turned off and the residues allowed to cool to ambient temperature. They were then hand ground to produce activated carbon particles having a size of less than 100 mesh. The activated carbon particles were then washed of 0.1N HCl (about 50 cc per 1.25 gram of residues), followed by water. The activated carbon particles were evaluated for adsorption capabilities using three concentrated organic compound solutions: $1.0 \times 10^{-2}$M m-nitrophenol, $5.0 \times 10^{-3}$M o-nitroaniline, and $1.0 \times 10^{-2}$M nitrobenzene. A quantity (0.1 g) of the particles was added to 2.0 ml of each organic solution. After filtration, each solution was measured for its residual concentration of the particular organic compound by means of high performance liquid chromatography (HPLC). The results showed that the ground activated char particles adsorbed up to 99.9% of each organic compound from their respective aqueous solutions.

EXAMPLE 2

The adsorptive capacity of a sample of activated carbon particles (100 mesh) comprising charred rice hulls prepared as described in Example 1 was compared to that of activated carbon particles (100 mesh) prepared from rice hulls using the same process as in Example 1, except that methane was flowed over the residues during carbonization and steam was flowed over the residues during activation. The adsorptive capacity was determined for m-nitrophenol ($1.0 \times 10^{-2}$M) and o-nitroaniline ($5.0 \times 10^{-3}$M). The results of these adsorption tests were as follows:

| Compound | Adsorption Time (mins) | -Example 1- Act. Carbon of the Invention (% removed) | -Example 2- Comparative Act. Carbon (% removed) |
|---|---|---|---|
| m-Nitrophenol | 20 | 95.0 | 5.0 |
| m-Nitrophenol | 48 | >99.9 | 8.3 |
| o-Nitroaniline | 20 | 98.2 | 24.3 |
| o-Nitroaniline | 48 | >99.9 | 38.7 |

EXAMPLE 3

Activated carbon prepared according to Example 1 was compared to commercially available activated carbon. Ten liters of tap water was poured through one liter of each type of activated carbon. The activated carbon prepared in accordance with Example 1 was determined to remove 99% of all hydrocarbons and chlorocarbons from the water, while the commercial activated carbon removed 90–95% of such compounds.

As various changes could be made in the above embodiments without departing from the scope of the invention, it is intended that all matter contained in the above description shall be interpreted as illustrative and not in a limiting sense.

What is claimed is:

1. A process for producing an activated carbon product from agricultural residues comprising:

heating agricultural residues having less than about 10% by weight lignin to a temperature in the range of about 250° C. to about 550° C. to volatilize organic compounds in the agricultural residues and to carbonize the agricultural residues while flowing a gas consisting essentially of an inert gas over the residues to carry volatilized organic compounds away from the residues in an exhaust stream; and activating the carbonized residues by heating to a temperature in the range of between about 600° C. and about 800° C. to produce an activated carbon product consisting essentially of the activated agricultural residues.

2. The process of claim 1 wherein said inert gas is selected from the group consisting of nitrogen and argon.

3. A process for producing an activated carbon product from agricultural residues comprising:

heating agricultural residues having less than about 10% by weight lignin to a temperature of at least about 250° C. to volatilize organic compounds in the agricultural residues and to carbonize the agricultural residues; and activating the carbonized residues by heating to produce an activated carbon product;

wherein said heating to volatilize organics and to carbonize the residues is to a temperature in the range of about 250° C. to about 550° C. for between about 2 and about 4 hours while flowing a gas consisting essentially of an inert gas over the residues to carry volatilized organic compounds away from the residues in an exhaust stream, said 550° C. upper limit being selected to avoid the potential for decomposition of said organic compounds and deposit thereof on the residues; and wherein said heating to activate the carbonized residues is to a temperature in the range of between about 600° C. and about 800° C. for between about 2 and 3½ hours.

* * * * *